United States Patent [19]
Sohn

[11] Patent Number: 5,901,177
[45] Date of Patent: May 4, 1999

[54] HIGH SPEED VARIABLE LENGTH CODE DECODING APPARATUS AND METHOD

[75] Inventor: Young-Seok Sohn, Seoul, Rep. of Korea

[73] Assignee: Daewoo Electronics Co., Ltd., Seoul, Rep. of Korea

[21] Appl. No.: 08/706,148

[22] Filed: Aug. 30, 1996

[30] Foreign Application Priority Data

Aug. 31, 1995 [KR] Rep. of Korea ...................... 95-28088

[51] Int. Cl.⁶ ................................................ H04B 1/66
[52] U.S. Cl. .............................. 375/240; 341/61; 341/65; 341/67
[58] Field of Search ............................. 375/240; 341/61, 341/65, 67; 358/261.1; 348/390

[56] References Cited

U.S. PATENT DOCUMENTS

| | | | |
|---|---|---|---|
| 5,173,695 | 12/1992 | Sun et al. | 341/67 |
| 5,245,338 | 9/1993 | Sun | 341/67 |
| 5,394,144 | 2/1995 | Kim | 341/67 |
| 5,557,271 | 9/1996 | Rim et al. | 341/67 |
| 5,561,690 | 10/1996 | Park | 375/340 |
| 5,668,548 | 9/1997 | Bakhmutsky | 341/67 |
| 5,675,331 | 10/1997 | Watanabe et al. | 341/67 |
| 5,677,690 | 10/1997 | Sohn | 341/67 |
| 5,696,506 | 12/1997 | Yu | 341/67 |
| 5,696,507 | 12/1997 | Nam | 341/67 |

*Primary Examiner*—Stephen Chin
*Assistant Examiner*—Mohammad Gayour
*Attorney, Agent, or Firm*—Anderson, Kill & Olick, P.C.

[57] ABSTRACT

A variable-length code decoding apparatus for decoding sequential variable-length codewords includes a first barrel shifter for producing a first window output sequence in response to a window control signal, a second barrel shifter for producing a second window output sequence and a code value in response to a decoded codeword length, a relay circuit for latching the second window output sequence for the clock cycle and providing the latched second window output sequence as a decoding output sequence, a first look-up table memory for producing the decoded codeword length in response to a pre_fix code of the variable-length codeword that begins at the first bit position of the decoding output sequence, a second look-up table memory for producing a fixed-length word in response to the decoded codeword length and the code value, and an accumulation block for producing the window control signal.

8 Claims, 3 Drawing Sheets

FIG. 3

| | LEAD111 | LATCH101 | LATCH102 | LEAD117 (SHIFT 1) | LEAD119 (SHIFT 2) | LEAD127 (LATCH106) | LEAD211 | LEAD315 | LEAD320 | LEAD 411 (READ-DATA) |
|---|---|---|---|---|---|---|---|---|---|---|
| 1 | F F F F | F F F F | F F F F | F F F F | F F F F | F F F F | 0 | 0 | 0 | 1 |
| 2 | AaBbCcc cDDddEe | F F F F | F F F F | F F F F | F F F F | F F F F | 16 | 16 | 0 | 1 |
| 3 | eeeeFfff fffGgggg | AaBbCcc cDDddEe | F F F F | AaBbCcc cDDddEe | AaBbCcc cDDddEe | F F F F | 16 | 32 | 16 | 1 |
| 4 | gggHhhh hhhIiiii | eeeeFfff fffGgggg | AaBbCcc cDDddEe | eeeeFfff fffGgggg | BbbCcccD DdddEeee | AaBbCcc cDDddEe | 2 | 18 | 16 | 0 |
| 5 | gggHhhh hhhIiiii | eeeeFfff fffGgggg | AaBbCcc cDDddEe | eeFfffff fGgggggg | CcccDDdd dEeeeeF | BbbCcccD DdddEeee | 3 | 21 | 18 | 0 |
| 6 | gggHhhh hhhIiiii | eeeeFfff fffGgggg | AaBbCcc cDDddEe | fffffFGg ggggggHh | DDddEee eeeFffff | CcccDDdd dddEeee | 4 | 25 | 21 | 0 |
| 7 | gggHhhh hhhIiiii | eeeeFfff fffGgggg | AaBbCcc cDDddEe | ffGgggg ggHhhhhh | EeeeeFf ffffGgg | DdddEee dEeeeeF | 5 | 30 | 25 | 0 |
| 8 | gggHhhh hhhIiiii | eeeeFfff fffGgggg | AaBbCcc cDDddEe | ggggHhh hhhhhii | FfffffG gggggggH | EeeeeFf ffffGgg | 6 | 36 | 30 | 1 |
| 9 | iiiiiiJj Jjjjjjjj | gggHhhh hhhIiiii | eeeeFfff fffGgggg | hhhhhhhh hliiiiii | Ggggggg Hhhhhhhh | FfffffG gggggggH | 7 | 27 | 20 | 0 |
| 10 | iiiiiiJj Jjjjjjjj | gggHhhh hhhIiiii | eeeeFfff fffGgggg | hliiiiii iiJjjjjj | Hhhhhhhh hIiiiiii | Ggggggg Hhhhhhhh | 8 | 35 | 27 | 1 |

HIGH SPEED VARIABLE LENGTH CODE DECODING APPARATUS AND METHOD

FIELD OF THE INVENTION

The present invention relates to a variable length code (VLC) decoding apparatus; and, more particularly, to an improved VLC decoding apparatus which is capable of providing a high speed decoding operation by decreasing the complexity of the decoder structure.

DESCRIPTION OF THE PRIOR ART

A variable length coding is a technique often used to achieve lossless data compression. This technique is used to convert fixed-length data to variable-length codewords based on the statistical occurrences of the data. The codeword lengths are chosen in such a manner that shorter codewords are used to represent more frequently occurring data and longer codewords are selected to represent less frequently occurring data. By properly assigning the variable-length codewords to a library of all possible source codewords, the average word length of variable-length codewords may become shorter than that of the original data, thereby rendering it possible to compress the data.

In this connection, Huffman code design is a procedure commonly used to construct a minimum redundant variable length code for known data statistics. In general, an encoding process can be implemented by using a table-lookup process based on input data to address the table. The codewords and the word-length information are stored as contents of the table and outputted sequentially through the use of a buffer at a constant data rate onto the data channel.

At a receiving end of the encoded or compressed data, however, a decoding process may become more complicated. Owing to the varying length, each codeword has to be segmented from the received bit string before it can be decoded into a source symbol. Therefore, the task of designing of a variable length decoder is more difficult than that of a variable length encoder.

There are several known apparatus for use in decoding a stream of variable length codewords. Among them, a most often used one is a VLC decoder employing a tree-searching algorithm such as the one disclosed in U.S. Pat. No. 4,899,149 issued on Feb. 6, 1990 to Gary Kahan. In this device, a variable length code is represented by a tree with codewords as leaves (also called terminal nodes). The decoding process starts from the root of the code tree and is guided by the received bit stream to follow one of two branches at each node. When a leaf is reached, the end of a codeword is detected and is segmented from the remaining bit stream. This type of decoding apparatus includes a logic circuitry corresponding to the tree and a control circuitry to traverse the code tree. This approach may be slow, however, especially for long codewords, since a bit-by-bit search through the code tree is required for each decoded symbol.

A lookup-table based VLC decoder is disclosed in U.S. Pat. No. 5,173,695 issued on Dec. 22, 1992 to Ming-Ting Sun, et al.; and also in U.S. Pat. No. 5,245,338 to Ming-Ting Sun. This decoder includes two cascaded latch circuits, each having a bit capability equal to a maximum codeword length, which store consecutive bits supplied from an input buffer memory for storing the stream to be decoded in fixed-length data segments; a barrel shifter connected to the two latch circuits for providing a sliding decoding window output equal in length to the maximum codeword length; an accumulator which accumulates, modulo the maximum codeword length, the lengths of sequentially decoded variable length codewords; and a lookup-table memory device for outputting a fixed-length word corresponding to a variable-length codeword contained in the sliding decoding window output and also for outputting a length of the variable-length codeword. As a codeword is decoded during each clock cycle, its length is accumulated and the decoding window of the barrel shifter is shifted to begin with the first bit of the next codeword to be decoded. When, during a clock cycle, the accumulated length exceeds the maximum codeword length, which would indicate that all the bits in the second latch circuit have been decoded, the bits in the first latch circuit are transferred into the second latch circuit and the next fixed-data segment of bits is read into the first latch circuit from the input buffer memory.

In the afore-described decoder structure, the operational speed is limited by the operational delay of the components in a critical path that includes the lookup-table memory, the barrel shifter, and the accumulator.

Accordingly, it still remains desirable to decrease the complexity of the decoder structure as well as the speed of the operation.

SUMMARY OF THE INVENTION

It is, therefore, a primary object of the invention to provide a VLC decoding apparatus, which reduces the structural complexity of the apparatus and enhances the speed of operation thereof.

In accordance with the present invention, a VLC decoding apparatus for decoding sequential variable-length codewords supplied from an input buffer which stores an input bit stream to be decoded in fixed-length segments having a length equal to twice a longest length of the variable-length codewords, the apparatus comprising: a first and a second latch circuits for storing consecutive fixed-length segments of the input bit stream in the input buffer; a first barrel shifter connected to the first and the second latch circuits and having a first output window for producing a first window output sequence from bits in the consecutive fixed-length segments from the first and the second latch circuits, the bit length of the first window output sequence being equal to the longest length of the variable-length codewords and the first output window being shifted across the bits in the first and the second latch circuits in direct response to a window control signal; a second barrel shifter connected to the first barrel shifter and having a second output window for producing a second window output sequence from bits contained in the first window output sequence and a previous decoding output sequence applied thereto, and generating high-order M bits from the first bit in the second window output sequence as a code value, the bit length of the second window output being equal to the longest length of the variable-length codewords, the second output window being shifted in direct response to a codeword length and M being an integer smaller than the longest length of the variable-length codewords; a relay circuit for latching the second window output sequence and producing the latched second window output sequence as the decoding output sequence; a first memory coupled to the relay circuit for producing a codeword length in response to a pre_fix code which consists of high-order P bits of the variable-length codeword that begins at the first bit position of the decoding output sequence, the maximum value of P being an integer smaller than the longest length of the variable-length codewords; a second memory connected to the first memory and the second barrel shifter for producing a fixed-length word in response to the codeword length and the code value; an accumulation block for adding the codeword length to a previously accumulated codeword length in order to produce the window control signal indicating the added and accumulated codeword length, the accumulation block generating a read signal to retrieve a next fixed-length segment stored in the input buffer when the accumulated codeword length is greater than twice the longest length of the variable-length codewords, the next fixed-length segment being stored in the first latch circuit and the fixed-length segment previously stored in the first latch circuit being transferred to the second latch circuit.

BRIEF DESCRIPTION OF THE DRAWINGS

The above and other objects and features of the instant invention will become apparent from the following description of preferred embodiments taken in conjunction with the accompanying drawings, in which:

FIG. 3 provides an explanatory diagram for illustrating the operation of the VLC decoding apparatus shown in FIG. 1.

DETAILED DESCRIPTION OF THE PREFERRED EMBODIMENTS

Figure 1:
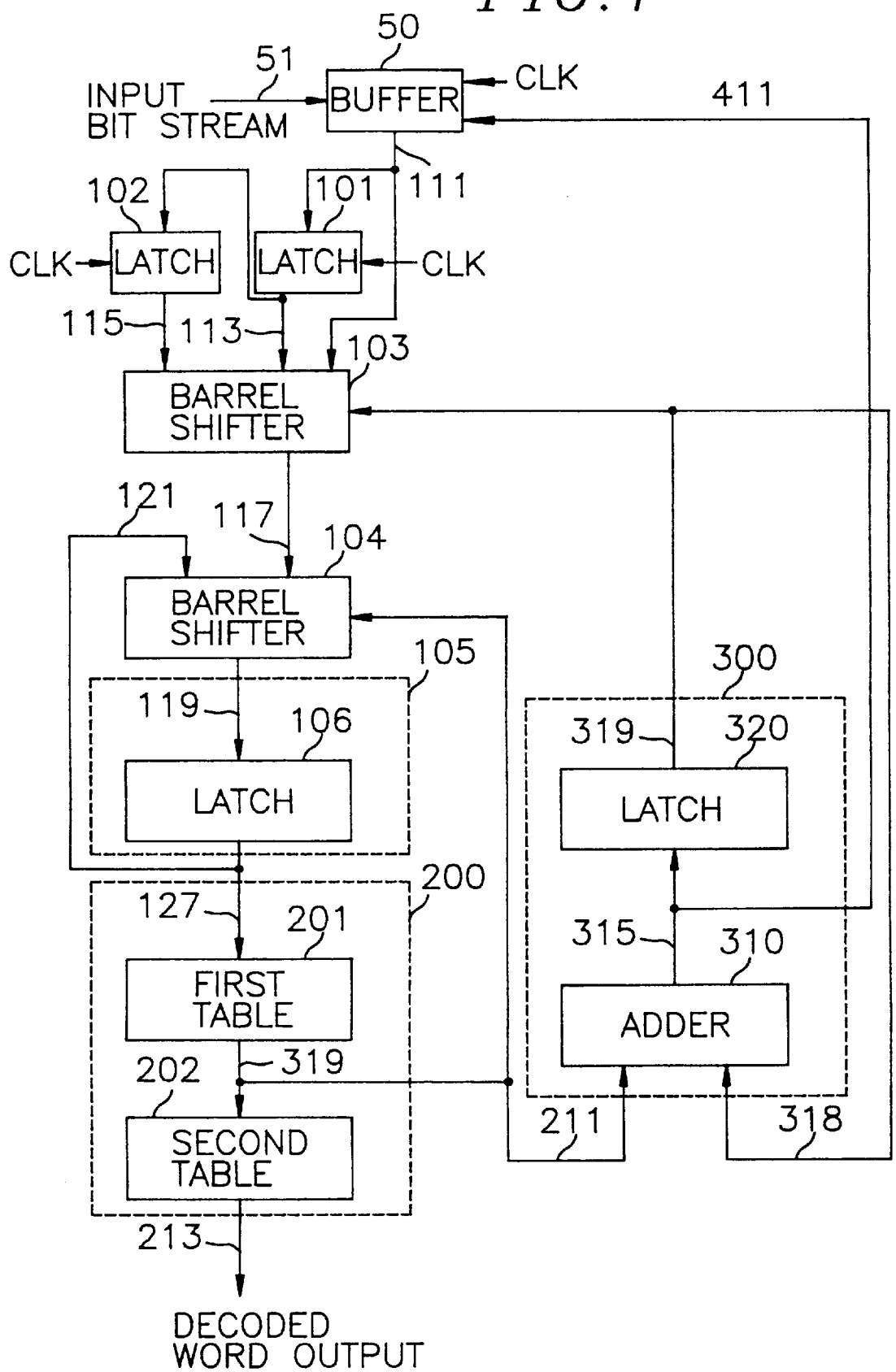
FIG. 1 shows a schematic diagram of a VLC decoding apparatus in accordance with the present invention.

In the embodiment of the present invention shown in FIG. 1, it is assumed for illustrative purposes that the maximum length of the variable-length codewords to be decoded is 16-bits. The VLC decoder decodes successive variable-length codewords inputted thereto in a continuous bit stream and outputs decoded fixed-length codewords corresponding thereto, at a fixed symbol clock, on a lead 213.

A serial data stream received on a data channel 51 is inputted to an input buffer memory 50 which stores, in fixed-length data segments, the serial data stream of variable-length codewords and sequentially outputs the fixed-length data segments, e.g., 16-bit segments on a lead 111 at a clock tick, e.g., a clock signal CLK in response to a READ signal on a lead 411, wherein the bit length of the data segment is twice the maximum bit length of the variable-length codewords.

A latch circuit 101 is connected to the input buffer memory 50 and sequentially receives fixed-length data segments on the lead 111 from the input buffer memory 50. A latch circuit 102 is connected to the latch circuit 101 and receives the fixed-length data segment previously held in the latch circuit 101. The latch circuits 101 and 102 are controlled latches which latch-in the data at their inputs at a clock tick of the CLK, wherein the latched data are retained at their outputs until the next clock tick of the CLK. As will be described, the latch circuits 101 and 102 read-in data at their inputs, e.g., at a clock tick of the CLK. When a new data segment needs to be supplied, a READ signal is activated on the lead 411. When the READ signal on the lead 411 is activated, a next data segment is retrieved from the input buffer memory 50 onto the lead 111 at a clock tick of the CLK. At the next clock tick of the CLK, the latch circuit 101 latches out the data segment held therein to the latch circuit 102 and latches the next data segment on the lead 111 thereinto. Therefore, the data segment held in the latch circuit 102 is always sequentially earlier in time than the data segment contained in the latch circuit 101.

The data segments held in the latch circuits 102 and 101 and the output of the input buffer memory 50 held on the lead 111 are inputted to a first barrel shifter 103 to form a consecutive 48-bits data stream.

The first barrel shifter 103 has a 16-bit slidable output window moving across the 48-bits, wherein the position of the output window is controlled by a window control signal indicating accumulated codeword lengths supplied through a lead 319 from an accumulation block 300. When the window control signal is activated on the lead 319, the 16-bit slidable output window of the first barrel shifter 103 is shifted to include in it a next 16-bit sequence of the data segments in the first barrel shifter 103 as indicated by the window control signal. In response to a clock tick, the previous data segment in the latch circuit 101 is latched into the latch circuit 102 as a twice previous data segment and the current data segment on the lead 111 is latched into the latch circuit 101 as the previous data segment. And at a next clock tick, the next 16-bit data segment is retrieved from the input buffer memory 50 to appear at input bit position 33–48 of the first barrel shifter 103 as a current data segment. The output from the first barrel shifter 103, i.e., the first window output sequence, is a 16-bit sequence from the 48 bit data stream of the three input data segments, i.e., the twice previous data segment and the previous data segment outputted from the latch circuits 102 and 101, and the current data segment outputted from the input buffer memory 50; and is supplied to the 16-bit input second barrel shifter 104 over a lead 117. The second barrel shifter 104 also receives a 16-bit decoding output sequence produced at the previous clock tick through a lead 121 in order to produce a next output sequence.

The second barrel shifter 104, which has a 16-bit slidable output window moving across the 32-bits stream inputted thereto and is controlled by a codeword length supplied through a lead 211 from a memory device 200, serves to output a second window output sequence to a lead 119 by using its slidable output window, which is shifted to a new position determined by the codeword length on the lead 211; and to simultaneously produce a code value of M, e.g., 3 bits to the memory device 200 through a lead 127, M being an integer smaller than the maximum length of the variable-length codeword.

In a preferred embodiment of the invention, a 3-bit sequence in the 16-bit input data is allocated for the code value, wherein the 3-bit sequence is left-positioned from the first bit in the second window output sequence. If the number of bits left-positioned from the first bit in the second window output sequence is less than 3, the second barrel shifter 104 generates the code value of 3-bit sequence by adding 1's as high-order bits of the 3-bit sequence. The second window output sequence from the second barrel shifter 104 is provided to a relay circuit, i.e., a latch 106. The latch 106 latches the second window output sequence and provides the latched second window output sequence over the lead 127 to the memory device 200 as a decoding output sequence. More specifically, the second window output sequence on the lead 119 produced at a clock tick from the second barrel shifter 104 is latched in the latch circuit 106. The latch circuit 106 latches in the data at their inputs.

The memory device 200, which is coupled to the latch 106, serves to produce a fixed-length word and a codeword length corresponding to a variable-length codeword that begins at the first bit position of the decoding output sequence. In a preferred embodiment of the invention, the memory device 200 includes first and second look-up tables 201 and 202, each of which may be implemented by, e.g., a programmable logic array(PLA). The first look-up table 201 is employed for pre_fix decoding to produce a codeword length, while the second look-up table 202 is employed for sub_fix decoding to produce a decoded word. The first look-up table 201 contains a pre_fix code table and a decoded word length table. A pre_fix code for each of the variable-length codewords is represented as an entry in the pre_fix code table, wherein each of the pre_fix codes consists of high-order P bits of each codeword, the high-order P bits being capable of indicating the length of each codeword and the maximum value of P being an integer smaller than the maximum length of the variable-length codeword, i.e., 16. Each table entry in the pre_fix code table has a length of 16 bits, and begins with an actual pre_fix code of variable length. The length of a codeword is detected when a sequence from the latch 106 matches one of the bit patterns stored in the pre_fix code table. Thus, for example, if one of the bit patterns of a pre_fix code in the pre_fix code table is "11", its 16-bit table entry will be "11XX XXXX XXXX XXXX", where each "X" represents a "don't care". If the 16-bit sequence from the latch 106 has a pattern "1101 1010 1010 1100", then a match occurs on the first two bits. When the decoding output sequence on the lead 127 matches an entry in the pre_fix code table, the corresponding entry in the decoded word length table is activated. The decoded word length table outputs on the lead 211 the codeword length corresponding to the matched pre_fix code of the variable-length codeword in the pre_fix code table. This codeword length supplied to the second barrel shifter 104 via the lead 211, at a next clock tick, is used to control the shift of the slidable output window of the second barrel shifter 104, and is inputted into the second look-up table 202. The second look-up table 202 containing a sub_fix code table, a codeword length table and a decoded word table. The codeword length for each variable-length codeword is represented as an entry in the codeword length table; and a sub_fix code for each of the variable-length codewords is represented as an entry in the sub_fix code table, wherein each of the sub_fix codes consists of low-order Q bits of each codeword, the value of Q being equal to a value obtained by subtracting P from the maximum length of the variable-length codewords.

In the preferred embodiment of the invention, a variable-length codeword consists of the P-bit pre_fix code and the Q-bit sub_fix code. A fixed-length word is detected when the codeword length on the lead 211 and the code value on the lead 121 match one of the bit patterns stored in the respective codeword length and sub_fix code tables. For example, if one of the bit patterns of a sub_fix code in the sub_fix code table is "01", its 3-bit table entry will be "X01", where "X" represents a "don't care". If the code value on the lead 121 has a pattern "101", then a match occurs on the last two bits. As is described above, when the codeword length on the lead 211 and the code value on the lead 121 match entries in the codeword length and sub_fix code tables, respectively, the corresponding entry in the decoded word table is activated. The decoded word table outputs on a lead 213 the fixed-length word corresponding to the matched sub_fix code and the codeword length in the respective sub_fix code and codeword length tables.

In the meantime, the codeword length on the lead 211 is supplied to the accumulation block 300 which serves to accumulate decoded codeword lengths and to generate the window control signal onto the lead 319, which represents the accumulated codeword length and is used to control the first barrel shifter 103.

The accumulation block 300 includes an adder 310 and a latch circuit 320. The adder 310 adds the codeword length on the lead 211 to the previously accumulated codeword length on a lead 318 to provide it to the latch circuit 320 at clock tick. In the preferred embodiment of the invention, an output on a lead 315 of the adder 310 generated at the previous clock tick, is latched in the latch circuit 320. And the adder 310 detects the most significant bit(MSB) of the codeword length and supplies it to the input buffer memory 50 via the lead 411 as a READ signal. If the codeword length detected in the adder 310 is equal to or greater than "32", the MSB of the codeword length detected in the adder 310 is set to be "1" and a READ signal is generated on the lead 411.

The window control signal on the lead 319 indicating the new accumulated codeword length is provided to the first barrel shifter 103 to control the position of the slidable output window thereof. When the accumulated codeword length is greater than or equal to "32", the MSB of the window control signal is set to be "1".

The input buffer memory 50, in response to the READ signal, retrieves the next data segment and outputs it onto the lead 111. In response to the clock tick, the data segment on the lead 111 is brought into the latch circuit 101, and the contents of the latch circuit 101 is transferred into the latch circuit 102.

Figure 2:
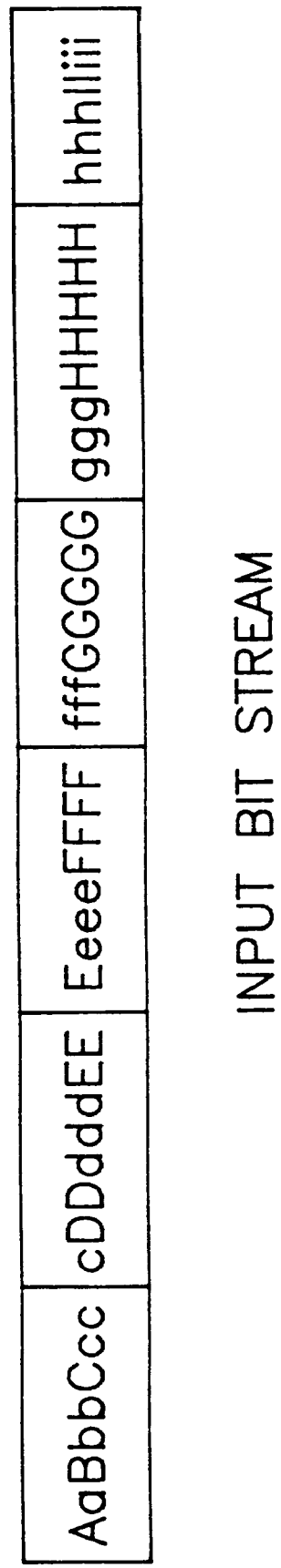
FIG. 2 depicts an input bit stream used for explaining the operation for the VLC decoding apparatus shown in FIG. 1.

The operation of the decoder in FIG. 1 may be more readily understood with reference to an example shown in tabular form in FIGS. 2 and 3. It is assumed that the data stream inputted from the data channel 51 to the input buffer memory 50 shown in FIG. 1 consists of the bit stream "AaBbb Ccc cDDdddEe eeeeFfff fffGgggg gggHhhhh hhh-hIiii . . . ", as shown in FIG. 2, wherein "Aa" represents two bits in the first variable-length codeword, "A" and "a" being a respective pre_fix code and a sub_fix code of the first variable-length codeword; "Bbb" represents the three bits in the second variable-length codeword, "B" and "b" being a respective pre_fix code and a sub_fix code of the second variable-length codeword, etc.

Referring to FIG. 3, prior to the first clock tick, the 16-bit latch circuits 101 and 102 are initialized with a "F F F F", the output of the latch circuit 106 is initialized with "F F F F", and the accumulation block 300 is initialized so that the READ signal are "1". Specifically, at the first clock tick, the initialized output of the first look-up table 201 on the lead 211 is "0", so that the second barrel shifter 104 has an initial shift of "0". Since the adder 310 is initialized with a binary number "100000", the READ signal is initialized to be "1". The window control signal indicating the newly accumulated codeword length on the lead 319 is "0", and the newly accumulated codeword length is transferred onto the lead 318 as the previously accumulated codeword length.

At the second clock tick, since the output of the first look-up table 201 on the lead 211 initialized value "16" and the newly accumulated codeword length "0" on the lead 318 are added at the adder 310 and the result is inputted to the latch circuit 320 via the lead 315. Subsequently, the window control signal becomes "16" by accepting the codeword length latched in the latch circuit 320. Since the previous READ signal was initialized to be "1", the first data segment consisting of the 16-bits of "AaBbbCcc cDDdddEe" is retrieved from the input buffer memory 50 onto a lead 111. In the meantime, the outputs of the latch circuits 101 and 102, the outputs of the barrel shifters 103 and 104 are initialized values, represented in FIG. 3 with "F F F F" and "F F F F".

At the third clock tick, since the READ signal at the second clock tick was initialized to be "1", wherein a next data segment of "eeeeFfff fffGgggg" is outputted from the input buffer memory 50 onto the lead 111. The data segment of "AaBbbCcc cDDdddEe" on the lead 111 is latched to the latch circuit 102. The output of the adder 310 becomes "32" by adding the previous decoded codeword length "16" on the lead 211 to the previously accumulated modulo 16 codeword length "16" on the lead 318 from the latch 320. The output of the adder 310, i.e., "32" is latched to the latch circuit 320 and transferred onto the lead 319 as the window control signal. Therefore, the READ signal remains to be "1", and the first barrel shifter 103 outputs "AaBbbCcc cDDdddEe" to the second barrel shifter 104 over the lead 117. The output sequence from the latch circuit 106 has its initialized value and the codeword length output of the first look-up table 201 remains as initialized as "16", so that the second barrel shifter 104 outputs, i.e., "AaBbbCcc cDDdddEe" to the latch 106 through the lead 119. The codeword length on the lead 211 is initialized to be "16". The latch circuit 102 contains its initialized value, and the decoded word of the second look-up table 202 contains noise values.

At the fourth clock tick, the previous READ signal was "1", wherein a next data segment of "gggHhhhh hhhhIiii" is outputted from the input buffer memory 50 onto the lead 111. The output of the adder 310 becomes "18" by adding the decoded codeword length "2" on the lead 211 to the previously accumulated codeword length "16" on the lead 318 from the latch 320. The output of the adder 310, i.e., "18" is latched in the latch circuit 320 and transferred onto the lead 319 as the window control signal. Therefore, the first barrel shifter 103 outputs "eeeeFfff fffGgggg" to the second barrel shifter 104. The sequence of "AaBbbCcc cDDdddEe" previously held in the latch 106 is supplied over the lead 127 as the decoding output sequence to the first look-up table 201, and to the second barrel shifter 104 via the lead 121. The first look-up table 201 recognizes the first one bit, i.e., "A" in the decoding output sequence of "AaBbbCcc cDDdddEe" and outputs the decoded codeword length, e.g., "2" corresponding to the recognized pre_fix code entry therein onto the lead 211. The decoded codeword length, "2", on the lead 211 is then coupled to the second look-up table 202 and to the second barrel shifter 104 which outputs "BbbCcccD DdddEeee" to the latch 106 over the lead 119. The second look-up table 202 recognizes the decoded codeword length "2", and the code value, "1Aa", and outputs the fixed-length decoded word, e.g., "A'" corresponding to the recognized codeword length and sub_fix code entries therein, onto the lead 213.

At the fifth clock tick, since the previous READ signal is "0" because the accumulated code word length is less than 32, a next data segment is not outputted from the input buffer memory 50 onto the lead 111. Therefor, the data segments on the lead 111, latch 101, latch 102 and lead 117 are not changed. The output of the adder 310 becomes "21" by adding the decoded codeword length "3" to the previously accumulated modulo 16 codeword length "18". The output of the adder 310, i.e., "21" is latched in the latch circuit 320 and transferred onto the lead 319 as the window control signal. Therefore, the first barrel shifter 103 outputs the sequence of "eeFfffff fGgggggg" to the second barrel shifter 104. The output sequence of "BbbCcccD DdddEeee" previously held in the latch 106 is provided to the first look-up table 201 and the second barrel shifter 104. The first look-up table 201 recognizes the first one bit, i.e., "B" in the decoding output sequence of "BbbCcccD DdddEeee" and outputs the decoded codeword length, e.g.,"3" corresponding to the recognized pre_fix code entry therein onto the lead 211. The decoded codeword length, "3", on the lead 211 is then coupled to the second look-up table 202 and to the second barrel shifter 104 which outputs the sequence of "CcccDDdd dEeeeeeF". The second look-up table 202 recognizes the decoded codeword length, "3", and outputs the fixed-length decoded word, e.g., "B'" corresponding to the recognized codeword length and sub_fix code entries therein, onto the lead 213.

At the sixth clock tick, since the previous READ signal still remains to be "0", data segments on the lead 111, latch 101 and latch 102 remain unchanged. The output of the adder 310 becomes "25" by adding the decoded codeword length "4" to the previously accumulated codeword length "21". The output of the adder 310, i.e., "25" is latched in the latch circuit 320 and transferred onto the lead 319 as the window control signal. Therefore, the first barrel shifter 103 outputs the sequence of "fffffFGg ggggggHh" to the second barrel shifter 104. The output sequence of "CcccDDdd dEeeeeeF" previously held in the latch 106 is coupled to the first look-up table 201 and the second barrel shifter 104. The first look-up table 201 recognizes the first one bit, i.e., "C" in the decoding output sequence of "CcccDDdd dEeeeeeF" and outputs the decoded codeword length, e.g., "4" corresponding to the recognized pre_fix code entry therein onto the lead 211. The decoded codeword length, "4", on the lead 211 is then coupled to the second look-up table 202 and to the second barrel shifter 104 which outputs the 8-bit sequence of "DDdddEee eeeFffff" to the latch 106. The second look-up table 202 recognizes the decoded codeword length, "4", and outputs the fixed-length decoded word, e.g., "C'" corresponding to the recognized codeword length and sub_fix code entries therein, onto the lead 213.

At the seventh clock tick, since the previous READ signal remains to be "0", a next data segment is not outputted from the input buffer memory 50 onto the lead 111. Therefore, the data segments on the lead 111, latch 101, latch 102 and lead 117 are unchanged and the three data segments inputted to the first barrel shifter 103 remains unchanged. The output of the adder 310 becomes "30" by adding the decoded codeword length "5" to the previously accumulated modulo 16 codeword length "25". The output of the adder 310, i.e., "30" is latched in the latch circuit 320 and transferred onto the lead 319 as the window control signal. The output sequence of "DDdddEee eeeFffff" previously held in the latch 106 is fed to the first look-up table 201 and the second barrel shifter 104. The first look-up table 201 recognizes the first two bits, i.e., "DD" in the decoding output sequence of "DDdddEee eeeFfff" and outputs the decoded codeword length, e.g., "5" corresponding to the recognized pre_fix code entry therein onto the lead 211. The decoded codeword length, "5", on the lead 211 is then coupled to the second look-up table 202 and to the second barrel shifter 104 which outputs the sequence of "EeeeeeFf fffffGgg" to the latch 106. The second look-up table 202 recognizes the decoded codeword length, "5" and outputs the fixed-length decoded word, e.g., "D'" corresponding to the recognized codeword length and sub_fix code entries therein, onto the lead 213.

At the eighth clock tick, since the previous READ signal remains as "0", a next data segment is not outputted from the input buffer memory 50 onto the lead 111. Therefore, the data segments on the lead 111, latch 101, latch 102 are unchanged. The output of the adder 310 becomes "36" by adding the decoded codeword length "6" to the previously accumulated codeword length "30". The output of the adder 310 is latched in the latch circuit 320 and transferred onto the lead 319 as the window control signal. Hence, the first barrel shifter 103 outputs the sequence of "gggggHhh hhh-hhhIi" to the second barrel shifter 104. The output sequence of "EeeeeeFf fffffGgg" previously held in the latch 106 at the seventh clock tick is supplied to the first look-up table 201 and the second barrel shifter 104. The first look-up table 201 recognizes the first three bits, i.e., "EEE" in the decoding output sequence of "EEEeeeFF" and outputs the decoded codeword length, e.g., "6" corresponding to the recognized pre_fix code entry therein onto the lead 211. The decoded codeword length, "6", on the lead 211 is then coupled to the second look-up table 202 and to the second barrel shifter 104 which outputs the 16-bit sequence of "FffffffG gggggggH" to the latch 106. The second look-up table 202 recognizes the decoded codeword length, "6", and the code value, "eee", and outputs the fixed-length decoded word, e.g., "E'" corresponding to the recognized codeword length and sub_fix code entries therein, onto the lead 213. On the lead 318, "6" is coupled as the previously accumulated modulo 16 codeword length by subtracting "30" from the widow control signal "36".

At the ninth clock tick, since the previous READ signal is "1", a next data segment of "iiiiiiJj jjjjjjjj" is outputted from the input buffer memory 50 onto the lead 111. And the data segment of "gggHhhhh hhhhIiii" previously held in the latch circuit 101 is latched into the latch circuit 102. The output of the adder 310 becomes "27" by adding the decoded codeword length "7" to the previously accumulated modulo 16 codeword length "20". The output of the adder 310 is latched in the latch circuit 320 and transferred onto the lead 319 as the window control signal. Consequently, the READ signal becomes "0", and the first barrel shifter 103 outputs the sequence of "hhhhhhhh Iiiiiiii" to the second barrel shifter 104. The output sequence of "FffffffG gggggggH" previously held in the latch 106 at the eighth clock tick is applied to the first look-up table 201 and the second barrel shifter 104. The first look-up table 201 recognizes the first four bits, i.e., "Ffff" in the decoding output sequence of "FffffffG gggggggH" and outputs the decoded codeword length, e.g., "7" corresponding to the recognized pre_fix code entry therein onto the lead 211. The decoded codeword length, "7", on the lead 211 is then coupled to the second look-up table 202 and to the second barrel shifter 104 which outputs the sequence of "Gggggggg Hhhhhhhh" to the latch 106. The second look-up table 202 recognizes the decoded codeword length, "7", and outputs the fixed-length decoded word, e.g., "F'" corresponding to the recognized codeword length and sub_fix code entries therein, onto the lead 213.

At the tenth clock tick, since the previous READ signal is "0", a next data segment is not outputted from the input buffer memory 50 onto the lead 111. Therefore, the data segments on the lead 111, latch 101, latch 102 are unchanged. The output of the adder 310 becomes "35" by adding the decoded codeword length "8" to the previously accumulated modulo 16 codeword length "27". The output of the adder 310 is latched in the latch circuit 320 and transferred onto the lead 319 as the window control signal. Consequently, the READ signal becomes "1", and the first barrel shifter 103 outputs the sequence of "hIiiiiii iiJjjjjj" to the second barrel shifter 104. The output sequence of "Gggggggg Hhhhhhhh" previously held in the latch 106 at the ninth clock tick is applied to the first look-up table 201 and the second barrel shifter 104. The first look-up table 201 recognizes the first four bits, i.e., "Gggg" in the decoding output sequence of "Gggggggg Hhhhhhhh" and outputs the decoded codeword length, e.g., "8" corresponding to the recognized pre_fix code entry therein onto the lead 211. The decoded codeword length, "8", on the lead 211 is then coupled to the second look-up table 202 and to the second barrel shifter 104 which outputs the sequence of "Hhhhhhhh hIiiiiii" to the latch 106. The second look-up table 202 recognizes the decoded codeword length, "8", and outputs the fixed-length decoded word, e.g., "F'" corresponding to the recognized codeword length and sub_fix code entries therein, onto the lead 213.

As may be seen from the above, it should be readily appreciated that the VLC decoding apparatus of the present invention carries out a decoding operation at each clock tick of the clock signal, thereby advantageously achieving a high speed decoding operation. Also, the structural complexity of the apparatus can be reduced by employing the accumulation block 300 containing the adder 310 and a latch circuits 320

While the present invention has been described with respect to the particular embodiments, it will be apparent to those skilled in the art that various changes and modifications may be made without departing from the scope of the invention as defined in the following claim.

What is claimed is:

1. A variable-length code decoding apparatus for decoding an input data bit stream of variable-length codewords, which comprises:

a buffer for storing the input data bit stream and generating N bits of a fixed-length segment at a time from the stored input data bit stream, wherein N is greater than or equal to a longest length of the variable-length codewords;

a first and a second cascaded bit storage devices for storing fixed-length segments outputted from the buffer, wherein the first bit storage device stores a previously generated fixed-length segment from the buffer and the second bit storage device stores a previously stored fixed-length segment in the first bit storage device;

a first shifter, connected to the first and the second bit storage devices and the buffer and having a first output window, for producing in response to a window control signal a first window output sequence of N bits from bits supplied in consecutive fixed-length segments from the first and the second bit storage devices and the buffer;

a second shifter, connected to the first shifter and having a second output window, for producing in response to a codeword length a second window output sequence of N bits from bits contained in the first window output sequence and a decoding output sequence applied thereto;

a relay device for latching the second window output sequence to thereby generate the latched second window output sequence as the decoding output sequence;

a memory, coupled to the relay device, for detecting a variable-length codeword from the decoding output sequence and producing the codeword length and a fixed-length word corresponding to the detected variable-length codeword;

an adder for adding the codeword length provided from the memory to the window control signal in order to produce an accumulated codeword length; and a latch for latching the accumulated codeword length to produce the latched codeword length as the window control signal.

2. The apparatus according to claim 1, wherein the adder generates a read signal if the accumulated codeword length is greater than or equal to 2N.

3. The apparatus according to claim 2, wherein the buffer generates a next fixed-length segment of a previously generated fixed-length segment in response to the read signal.

4. The apparatus according to claim 3, wherein the first output window is shifted across the bits contained in the consecutive fixed-length segments from the first and second bit storage devices and the buffer in direct response to the window control signal.

5. The apparatus according to claim 4, wherein the second output window is shifted across bits contained in the first window output sequence and the decoding output sequence direct response to the codeword length.

6. The apparatus according to claim 5, wherein the window control signal is set as (the accumulated codeword length−N) if the accumulated codeword length is equal to or greater than 2N.

7. The apparatus according to claim 6, wherein N is equal to the longest length of the variable-length codewords.

8. The apparatus according to claim 7, wherein N is 16.

\* \* \* \* \*